United States Patent
Lee et al.

(10) Patent No.: US 9,426,351 B2
(45) Date of Patent: Aug. 23, 2016

(54) AUTO-FOCUSING SYSTEM AND METHOD

(71) Applicant: HANWHA TECHWIN CO., LTD., Changwon-Si (KR)

(72) Inventors: Kyungeun Lee, Changwon-si (KR); Youngseo Park, Changwon-si (KR); Dongseuk Park, Changwon-si (KR); Chunwon Lee, Changwon-si (KR); Youngsang Kwon, Changwon-si (KR); Daebong Kim, Changwon-si (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 91 days.

(21) Appl. No.: 14/548,745

(22) Filed: Nov. 20, 2014

(65) Prior Publication Data

US 2016/0014326 A1 Jan. 14, 2016

(30) Foreign Application Priority Data

Jul. 10, 2014 (KR) .................. 10-2014-0086877

(51) Int. Cl.
| H04N 5/232 | (2006.01) |
| G06T 3/00 | (2006.01) |
| G06K 9/52 | (2006.01) |
| G06K 9/46 | (2006.01) |

(52) U.S. Cl.
CPC .......... *H04N 5/23212* (2013.01); *G06K 9/46* (2013.01); *G06K 9/52* (2013.01); *G06T 3/0056* (2013.01); *G06K 2009/4666* (2013.01)

(58) Field of Classification Search
CPC .... H04N 5/23212; G06T 3/0056; G06K 9/46; G06K 9/52; G06K 2009/4666
See application file for complete search history.

(56) References Cited

U.S. PATENT DOCUMENTS

| 6,298,166 B1* | 10/2001 | Ratnakar | G06T 3/60 375/E7.206 |
| 7,502,523 B2 | 3/2009 | Kim | |
| 8,345,162 B2* | 1/2013 | Mak | H04N 5/23212 348/326 |
| 2006/0044452 A1* | 3/2006 | Hagino | G02B 7/28 348/345 |
| 2006/0127077 A1* | 6/2006 | Kim | G02B 7/365 396/101 |
| 2007/0009249 A1* | 1/2007 | Kim | H04N 5/23212 396/121 |
| 2007/0177860 A1* | 8/2007 | Hooley | G02B 7/08 396/79 |
| 2007/0216796 A1* | 9/2007 | Lenel | H04N 5/2251 348/345 |
| 2007/0279516 A1* | 12/2007 | Ishii | G03B 13/36 348/345 |
| 2009/0096897 A1* | 4/2009 | Saito | G06T 7/0081 348/241 |
| 2009/0201410 A1* | 8/2009 | Nishiguchi | H04N 5/23212 348/345 |

FOREIGN PATENT DOCUMENTS

| JP | 4470651 B2 | 6/2010 |
| KR | 10-2006-0065099 A | 6/2006 |
| KR | 10-2006-0089093 A | 8/2006 |
| KR | 10-0739585 B1 | 7/2007 |
| KR | 10-2011-0072212 A | 6/2011 |

* cited by examiner

*Primary Examiner* — Roberto Velez
*Assistant Examiner* — Tuan Le
(74) *Attorney, Agent, or Firm* — Sughrue Mion, PLLC (57) ABSTRACT

An auto-focusing method includes dividing an image into a plurality of blocks, performing discrete cosine transform (DCT) on image data of the plurality of blocks to output a plurality of DCT blocks each comprising DCT coefficients, generating a DCT mask for selecting DCT coefficients corresponding to a selected frequency range in a DCT block among the plurality of DCT blocks, and calculating a focus value of the image by applying the generated DCT mask to the DCT block.

18 Claims, 7 Drawing Sheets

AUTO-FOCUSING SYSTEM AND METHOD

CROSS-REFERENCE TO THE RELATED APPLICATION

This application claims priority from Korean Patent Application No. 10-2014-0086877, filed on Jul. 10, 2014, in the Korean Intellectual Property Office, the disclosure of which is incorporated herein in its entirety by reference.

BACKGROUND

1. Field

Apparatuses and methods consistent with exemplary embodiments relate to auto-focusing.

2. Description of the Related Art

An auto-focusing function enables an image of an object to be most clearly focused on an image sensor by adjusting back and forth a position of a lens to make an unfocused blurry image a focused clear image. In an auto-focusing system of the related art, a focus value is generated by using frequency components of image signals in a particular area set in a screen window and a focus lens is moved in a direction in which the focus value becomes the maximum.

SUMMARY

Various exemplary embodiments provide an auto-focusing system and method by which auto-focusing is effectively performed in a low illumination state or a state having spots Various aspects of the exemplary embodiments will be set forth in part in the description which follows and, in part, will be apparent from the description, or may be learned by practice of the presented embodiments.

According to an aspect of an exemplary embodiment, there is provided an auto-focusing method which may include: dividing an image into a plurality of blocks; performing discrete cosine transform (DCT) on image data of the plurality of blocks to output a plurality of DCT blocks each comprising DCT coefficients; generating a DCT mask for selecting DCT coefficients corresponding to a selected frequency range in a DCT block among the plurality of DCT blocks; and calculating a focus value of the image by applying the generated DCT mask to the DCT block.

The DCT block may include a plurality of alternating current (AC) components divided into at least one low frequency component, at least one medium frequency component, and at least one high frequency component. The generating the DCT mask may include: generating at least one of a first DCT mask for selecting DCT coefficients corresponding to the low frequency component and a first medium frequency component adjacent to the low frequency component and a second DCT mask for selecting DCT coefficients corresponding to the high frequency component and a second medium frequency component adjacent to the high frequency component.

The calculating the focus value may include: calculating a first focus value of the image by applying the first DCT mask to the DCT block; calculating a second focus value of the image by applying the second DCT mask to the DCT block; and selecting one of the first focus value and the second focus value.

The selecting the focus value may include selecting one of the first focus value and the second focus value which has a lager change rate of a focus value.

The selecting the focus value may include: selecting the first focus value if the second focus value is less than a threshold value; and selecting the second focus value if the second focus value is equal to or greater than the threshold value.

The generating the DCT mask may include: generating the first DCT mask if the focus value is less than a threshold value; and generating the second DCT mask if the focus value is equal to or greater than the threshold value.

The high frequency component may include a first high frequency component and a second high frequency component that is higher than the first high frequency component, and the second DCT mask may be used for selecting DCT coefficients corresponding to the first high frequency component and the second medium frequency component adjacent to the first high frequency component.

Weights may be applied to the DCT coefficients selected by the first DCT mask or the second DCT mask.

A weight of the first DCT mask applied to the low frequency component may increase in inverse proportion to a frequency value, and a weight of the second DCT mask applied to the high frequency component may increase in proportion to the frequency value.

The calculating the focus value may include: calculating an average of absolute values of DCT coefficients of each DCT block that is masked with the DCT mask; and calculating an average of the averages of the absolute values of the DCT coefficients calculated with respect to the plurality of DCT blocks of the image, as the focus value of the image.

According to an aspect of another exemplary embodiment, there is provided an auto-focusing system which may include: a divider configured to divide an image into a plurality of blocks; a discrete cosine transform (DCT) processor configured to perform DCT on image data of the plurality of blocks to output a plurality of DCT blocks each comprising DCT coefficients; a mask generator configured to generate a DCT mask for selecting DCT coefficients corresponding to a selected frequency range in a DCT block among the plurality of DCT blocks; and a focus value calculator configured to calculate a focus value of the image by applying the generated DCT mask to the DCT block.

The mask generator may divide a plurality of alternating current (AC) components of the DCT block into at least one low frequency component, at least one medium frequency component, and at least one high frequency component, and generate at least one of a first DCT mask for selecting DCT coefficients corresponding to the low frequency component and a first the medium frequency component adjacent to the low frequency component and a second DCT mask for selecting DCT coefficients corresponding to the high frequency component and a second medium frequency component adjacent to the high frequency component.

The focus value calculator may include: a first calculator configured to calculate a first focus value of the image by applying the first DCT mask to the DCT block; a second calculator configured to calculate a second focus value of the image by applying the second DCT mask to the DCT block; and a selector configured to select one of the first focus value and the second focus value.

The selector may select one of the first focus value and the second focus value which has a lager change rate of a focus value.

The selector may select the first focus value if the second focus value is less than a threshold value, and select the second focus value if the second focus value is equal to or greater than the threshold value.

The mask generator may generate the first DCT mask if the focus value is less than a threshold value, and generate the second DCT mask if the focus value is equal to or greater than the threshold value.

The high frequency component may include a first high frequency component and a second high frequency component that is higher than the first high frequency component, and the second DCT mask may be used for selecting DCT coefficients corresponding to the first high frequency component and the second medium frequency component adjacent to the first high frequency component.

Weights may be applied to the DCT coefficients selected by the first DCT mask or the second DCT mask.

A weight of the first DCT mask applied to the low frequency component may increase in inverse proportion to a frequency value, and a weight of the second DCT mask applied to the high frequency component may increase in proportion to the frequency value.

The focus value calculator may calculate an average of absolute values of DCT coefficients of each DCT block that is masked with the DCT mask, and calculate an average of the averages of the absolute values of the DCT coefficients calculated with respect to the plurality of DCT blocks of the image, as the focus value of the image.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Reference will now be made in detail to exemplary embodiments of an inventive concept which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

The exemplary embodiments are described in detail with reference to the accompanying drawings. However, these embodiments are not limited thereto and it will be understood that various changes in form and details may be made therein without departing from the spirit and scope of the inventive concept. That is, descriptions on particular structures or functions may be presented merely for explaining exemplary embodiments of the inventive concept.

Terms such as "first" and "second" are used herein merely to describe a variety of constituent elements, but the constituent elements are not limited by the terms. Such terms are used only for the purpose of distinguishing one constituent element from another constituent element.

Terms used in the present specification are used for explaining a specific exemplary embodiment, not for limiting the inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

The exemplary embodiments are described herein in terms of functional block components and various processing steps. Such functional blocks may be realized by any number of hardware and/or software components configured to perform the specified functions. For example, the functional blocks may employ various integrated circuit components, e.g., memory elements, processing elements, logic elements, look-up tables, and the like, which may carry out a variety of functions under the control of one or more microprocessors or other control devices. Similarly, where the functional blocks may be implemented using software programming or software elements, the embodiments may be implemented with any programming or scripting language such as C, C++, Java, assembler, or the like, with the various algorithms being implemented with any combination of data structures, objects, processes, routines or other programming elements. Functional aspects of the embodiments may be implemented in algorithms that execute on one or more processors. Furthermore, the functional blocks or processing steps may employ any number of related art techniques for electronics configuration, signal processing and/or control, data processing and the like. The words "mechanism" and "element" are used broadly and are not limited to mechanical or physical embodiments, but may include software routines in conjunction with processors, etc.

Figure 1:
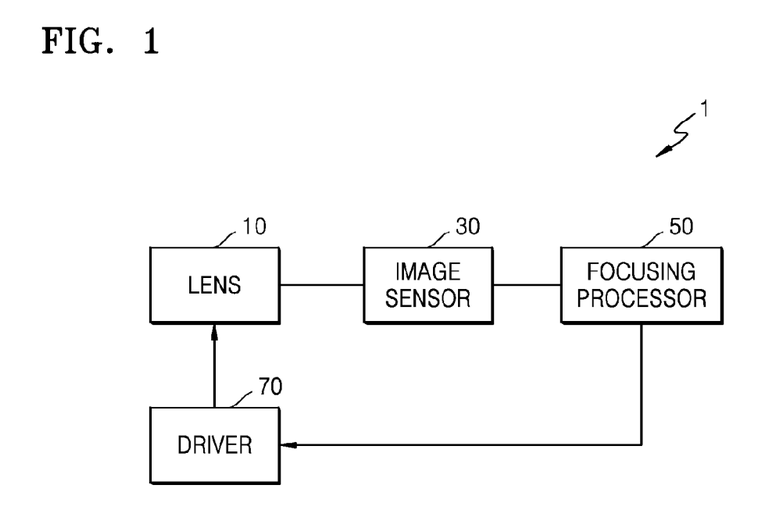
FIGS. 1 and 2 are block diagrams schematically illustrating an auto-focusing system according to an exemplary embodiment.
Figure 2:
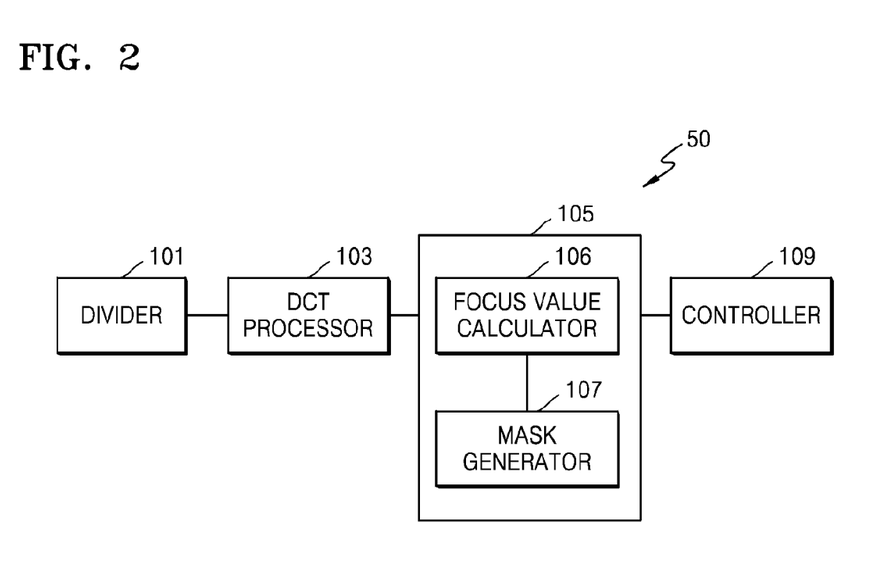
Figure 3:
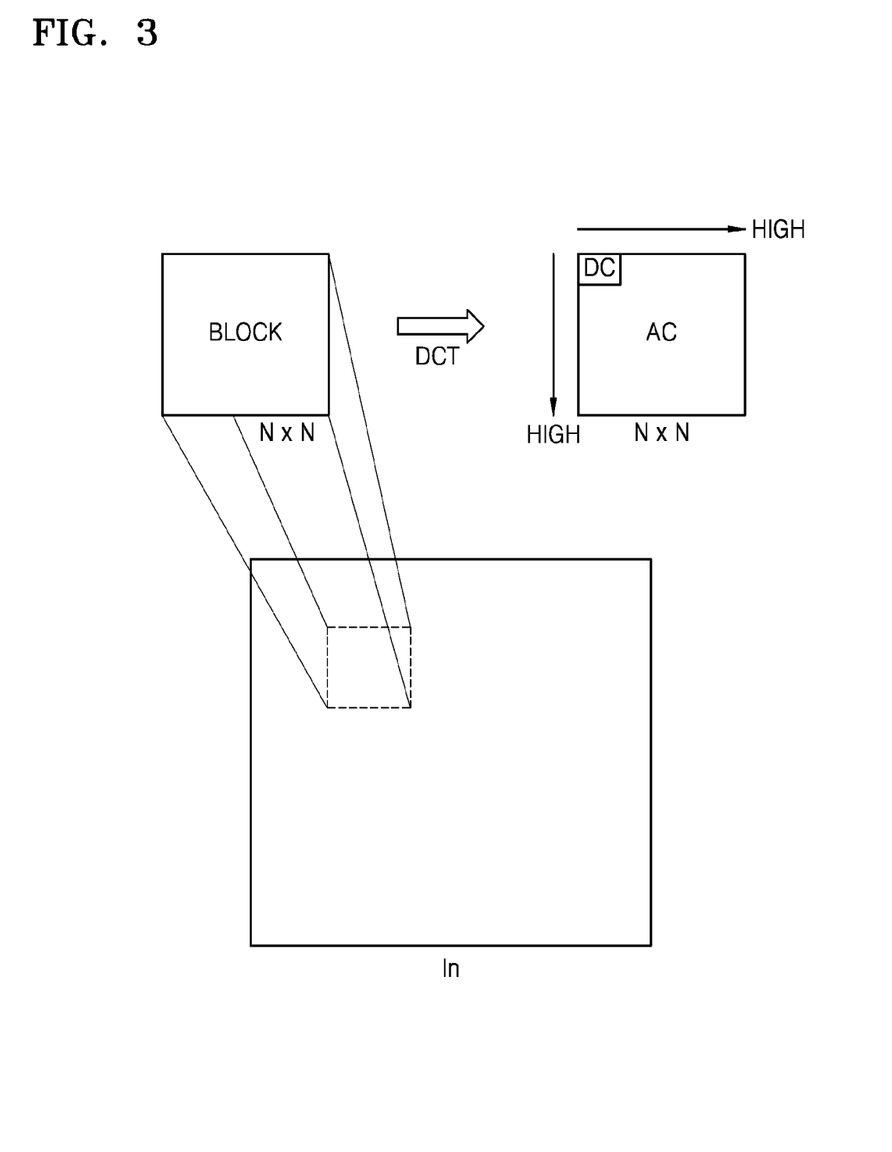
FIG. 3 illustrates an example of performing discrete cosine transform (DCT) for each block, according to an exemplary embodiment.

FIGS. 1 and 2 are block diagrams schematically illustrating an auto-focusing system 1 according to an exemplary embodiment. FIG. 3 illustrates an example of performing discrete cosine transform (DCT) for each block, according to an exemplary embodiment.

Referring to FIG. 1 the auto-focusing system 1 according to the present embodiment may include a lens 10, an image sensor 30, a focusing processor 50, and a driver 70.

Light reflected from an object converges at a point by passing through the lens 10 and the image sensor 30 converts the light to an electric signal. The image sensor 30 may output an image signal in an RGB Bayer pattern.

The focusing processor 50 may include a divider 101, a DCT processor 103, a focus value estimator 105, and a controller 109.

The divider 101 divides an image frame into a plurality of blocks having a predetermined size of N×N, where N is an integer. The size of a block may vary according to a system design. N×N pieces of data of each block correspond to pixel values, for example, Y (luminance) values.

The DCT processor 103, as illustrated in FIG. 3, performs two-dimensional DCT on each of the divided blocks of an image, transforms an image signal of a spatial domain to DCT coefficients of a frequency area, and outputs the DCT coefficients.

The DCT is a method of decomposing a luminance signal of an image from a low frequency component to a high frequency component. In each block on which DCT is performed (hereinafter, referred to as "a DCT block"), a high frequency component increases toward a lower side in a vertical frequency component and a high frequency component increases toward a right side in a horizontal frequency component. Accordingly, the low frequency component is concentrated at the upper left end of the DCT block and the high frequency component is concentrated at the lower right end of the DCT block.

DCT coefficients of the DCT block are arranged in an N×N matrix form. The DCT block may be sectioned into a direct current (DC) coefficient, a horizontal edge area, a vertical edge area, a diagonal edge area, and an entire edge area according to an arrangement position. A user may emphasize or disregard a particular frequency component by applying weights to each DCT block. Also, various types of focus values may be calculated by selectively extracting frequency components of various bands.

A first DCT coefficient is a DC component corresponding to an average value of an image, and the subsequent coefficients are alternating current (AC) components corresponding to the low frequency component to the high frequency component. Among the DCT coefficients of the AC components, the coefficients corresponding to the low frequency component are concentrated in the upper left portion, the coefficients corresponding to a medium frequency component are concentrated in the upper right portion and the lower left portion, and the coefficients corresponding to the high frequency component are concentrated in the lower right portion, and the right side and the lower side. Also, the coefficients corresponding to a vertical edge of the image are mainly concentrated in the upper right portion, the coefficients corresponding to a horizontal edge are mainly concentrated in the lower left portion, the coefficients corresponding to an entire edge are concentrated in the lower right portion, and the coefficients corresponding to a diagonal edge are concentrated in the other area.

The focus value estimator 105 may estimate a focus value of an image by applying a band pass filter, for filtering (selecting) a particular frequency component, on a DCT block. The focus value estimator 105 may include a focus value calculator 106 and a mask generator 107.

The focus value calculator 106 may calculate an average of absolute values of DCT coefficients of a DCT block that passed the band pass filter. The focus value calculator 106 may estimate a focus value of an image by averaging averages of absolute values of DCT blocks constituting an image frame.

The mask generator 107 may generate a DCT mask that functions as a band pass filter. An AC component of a DCT block is variably selected by masking the DCT block with the DCT mask. Accordingly, a focus may be quickly and accurately adjusted under an environment with noise and/or spot.

Below, Equation 1 indicates DCT masking (CM) with respect to a DCT block. Equation 2 is used to calculate an average (BCM) of absolute values of DCT coefficients of a masked DCT block. Equation 3 is used to calculate a focus value (FBCM) by averaging the BCMs of the DCT blocks with respect to a current frame image (n). In the equations, "C" denotes a DCT block of an N×N size, "M" denotes a DCT mask for selecting particular frequency components of the DCT block, and "I" and "j" denote matrix (row and column) position index of the DCT block in an image.

$$CM = C(N \times N) * M(N \times N) \quad (1)$$

$$BCM(i,j) = \mathrm{Mean}(\mathrm{Abs}(CM(N \times N))) \quad (2)$$

$$FBCM(n) = \mathrm{Mean}(BCM(i,j)) \quad (3)$$

In the present embodiment, the AC components of a DCT block may be divided into a plurality of frequency components, for example, at least one low frequency component LF, at least one medium frequency component MF, and at least one high frequency component HF. A focusing area may be divided into a plurality of areas, for example, a first focusing area for adjusting a focus based on the low frequency component LF of a DCT block and a second focusing area for adjusting a focus based on the high frequency component HF of the DCT block. The first focusing area is a focusing speed enhanced area in which a focus is adjusted by moving a lens at a fast speed in search of in-focus that is around a focal point from de-focus that is out of the focal point. The second focusing area is an area where the lens is moved in search of an accurate position of the focal point in the in-focus. In the present embodiment, the first focusing area is referred to as a climb area (Climb) and the second focusing area is referred to as a peak area (Peak). The first focusing area and the second focusing area may be identified based on a focus value.

The mask generator 107 may generate a first DCT mask for selecting DCT coefficients corresponding to a first frequency area of a DCT block. The first frequency area may include the low frequency component LF and a part of the medium frequency component MF (a first medium frequency component) adjacent to the low frequency component LF of the AC components. The mask generator 107 may generate a second DCT mask for selecting DCT coefficients corresponding to a second frequency area of a DCT block. The second frequency area may include the high frequency component HF and a part of a medium frequency component MF (a second medium frequency component) adjacent to the high frequency component HF of the AC components. The first DCT mask may be used to adjust the focus in the first focusing area and the second DCT mask may be used to adjust the focus in the second focusing area.

In the present embodiment, the DCT mask is changed according to the focusing area, thereby varying a frequency component to use. Accordingly, an auto-focusing speed may be increased and thus a clear image may be obtained.

The controller 109 controls the driver 70 referring to a calculated focus value in a direction in which the calculated focus value increases, that is, an image becomes clearer. Accordingly, the driver 70 may adjust the position of the lens 10.

The focusing processor 50 may be integrated into a camera together with the lens 10, the image sensor 30, and the driver 70, or into a separate computing apparatus.

Figure 4:
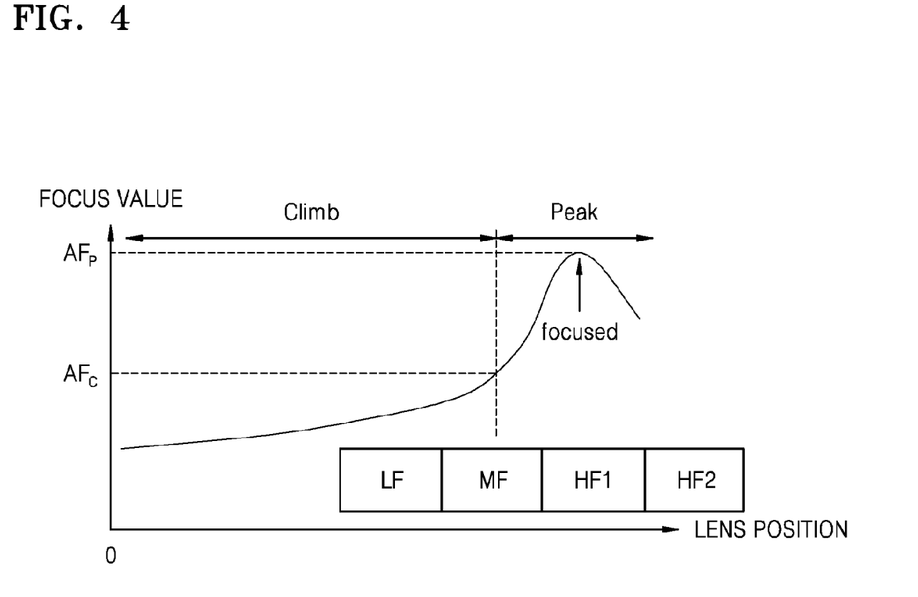
FIG. 4 is a graph showing a relationship between a focusing area and a frequency area in a focus value curve, according to an exemplary embodiment.

FIG. 4 is a graph showing a relationship between a focusing area and a frequency area in a focus value curve, according to an exemplary embodiment The auto-focusing system according to the present embodiment determines a position of a lens where a focus value is a peak to be a position where sharpness of an image is the maximum and moves the lens to the position. In the auto-focusing system, the DCT mask is used as a band pass filter that extracts and combines frequency components of a particular band for each area divided based on a focus value, among the frequency components calculated by performing the DCT, and thus auto-focusing may be performed quickly and accurately even in a low illumination environment, for example, at night and where spots exist.

Referring to FIG. 4, the auto-focusing system according to the present embodiment may use the first DCT mask that filters (selects) the low frequency component LF and the first medium frequency component MF of a DCT block in a first focusing area (Climb) where a focus value is equal to or less than AFc. The auto-focusing system may use the second DCT mask that filters (selects) the high frequency component HF and the second medium frequency component MF of the DCT block in a second focusing area (Peak) including a peak focus value AFp and where a focus value is equal to or greater than AFc. Since the high frequency component HF is much affected by noise, the high frequency component HF is divided into a first high frequency component HF1 that is relatively low and a second high frequency component HF2 that is relatively high. The second high frequency component HF2 may be excluded. Since noise of the high frequency component HF is removed, auto-focusing may be available even in an environment where spots exist.

Figure 5:
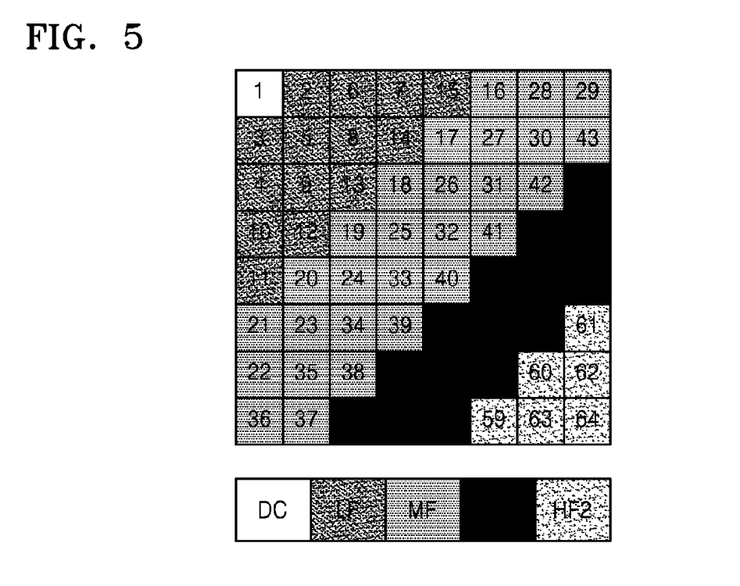
FIG. 5 illustrates an example of classification of frequency components of a DCT block, according to an exemplary embodiment.

FIG. 5 illustrates an example of classification of frequency components of a DCT block, according to an exemplary embodiment;

In the embodiment of FIG. 5, a DCT block having an 8×8 size includes DCT coefficients that are calculated by performing DCT transformation on an image block having an 8×8 size. The numbers in the DCT block are indexes indicating the positions of DCT coefficients. A first DCT coefficient is a DC component and the $2^{nd}$ to $64^{th}$ DCT coefficients are AC components. Of the AC components, the $2^{nd}$ to $15^{th}$ DCT coefficients correspond to low frequency components LF, the $16^{th}$ to $43^{rd}$ DCT coefficients correspond to medium frequency components MF, the $44^{th}$ to $58^{th}$ DCT coefficients correspond to the first high frequency component HF1, and the $59^{th}$ to $64^{th}$ DCT coefficients correspond to the second high frequency component HF2.

A part of the medium frequency components MF adjacent to the low frequency components LF (first medium frequency components) may be included in the first frequency area, and a part of the medium frequency components MF adjacent to the first high frequency components HF1 (second medium frequency components) may be included in the second frequency area.

According to an exemplary embodiment, the first DCT mask may filter (select) the $2^{nd}$ to $21^{st}$ DCT coefficients, and apply a weight to each of the filtered DCT coefficients. For example, the weight of the first DCT mask may be set to be relatively higher in a direction in which the low frequency component increases, that is, the index decreases. The second DCT mask may select the $37^{th}$ to $58^{th}$ DCT coefficients and a weight may be applied to each of the selected DCT coefficients. For example, the weight of the second DCT mask may be set to be relatively higher in a direction in which the high frequency component increases, that is, the index increases.

The inventive concept is not limited to the embodiment of FIG. 5. The areas of the low frequency components LF, the medium frequency components MF, and the high frequency components HF may be set to be different from one another according to the size of a DCT block and/or the size of a DCT mask, or user settings.

Figure 6:
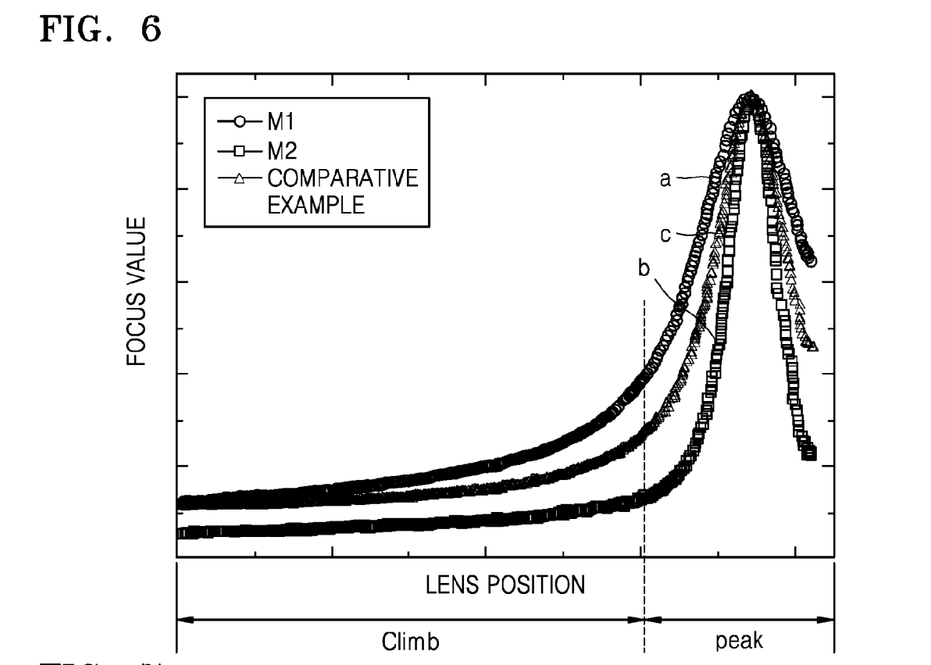
FIGS. 6 and 7 are graphs describing focusing by using a DCT mask, according to an exemplary embodiment.
Figure 7:
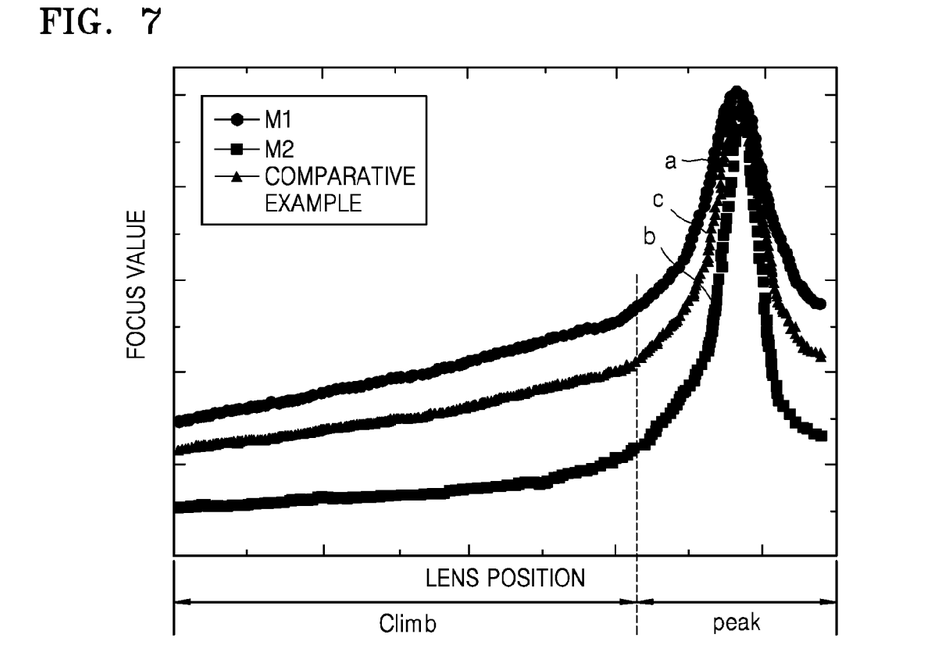

FIGS. 6 and 7 are graphs describing focusing by using a DCT mask, according to an exemplary embodiment. In the graphs, the x-axis denotes the position of a lens and the y-axis denotes a focus value.

FIG. 6 shows an example in which focusing is performed after DCT is performed on a daytime image, and FIG. 7 shows an example in which focusing is performed after DCT is performed on a nighttime image having spots and noise. FIGS. 6 and 7 illustrate an example (a and b) of performing focusing by using the first DCT mask M1 or the second DCT mask M2 according to the present embodiment and a comparative example (c) of performing focusing by selecting all AC components of a DCT block. The focus value graphs illustrated in FIGS. 6 and 7 may vary according to a camera installation environment.

Referring to FIGS. 6 and 7, for the daytime and nighttime cases, it may be seen that the inclination, that is, an increase-decrease rate or a change rate, of a focus value graph calculated by using the first DCT mask M1 is large in the first focusing area (Climb), and the inclination of a focus value graph calculated by using the second DCT mask M2 is large and has a narrow width in the second focusing area Peak.

In the present embodiment, auto-focusing is performed by using the first DCT mask M1 in the first focusing area, and the second DCT mask M2 in the second focusing area. In the first focusing area that is de-focus, the lens position is adjusted by using the low frequency components of an image and, in the second focusing area that is in-focus, the lens position is adjusted by using the high frequency components, thereby performing focusing more quickly. Accordingly, according to the present embodiment, auto-focusing may be quickly and accurately performed by reducing the time for searching for the lens position where the focus value becomes the maximum (peak).

Figure 8:
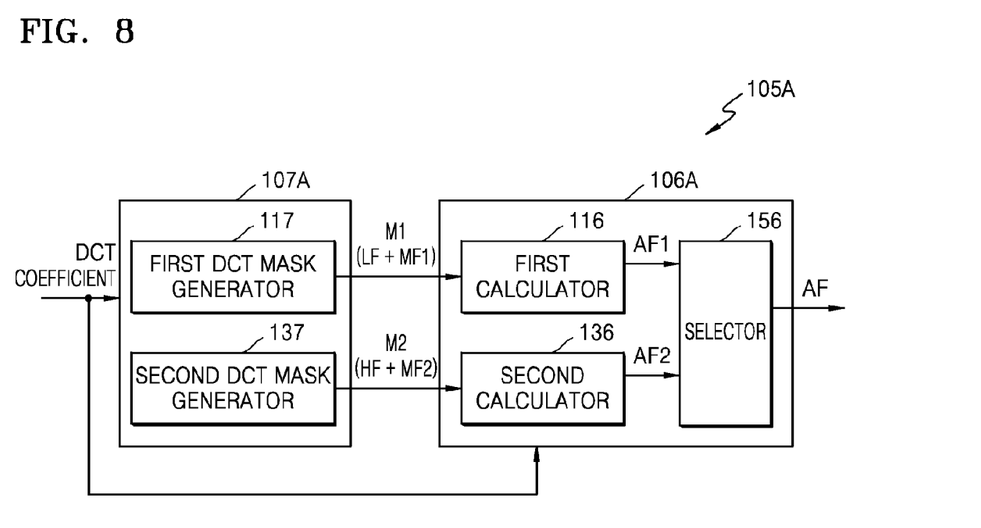
FIG. 8 is a block diagram schematically illustrating a structure of a focus value estimator, according to an exemplary embodiment.

FIG. 8 is a block diagram schematically illustrating a structure of the focus value estimator 105, according to an exemplary embodiment.

Referring to FIG. 8, a focus value estimator 105A according to the present embodiment may include a mask generator 107A and a focus value calculator 106A.

The mask generator 107A may include a first DCT mask generator 117 and a second DCT mask generator 137.

The first DCT mask generator 117 may generate the first DCT mask M1 through which the first frequency area including the low frequency components LF and a part of the medium frequency components MF (the first medium frequency component MF1) of a DCT block is passed.

The second DCT mask generator 137 may generate the second DCT mask M2 through which the second frequency area including the high frequency components HF and a part of the medium frequency components MF of a DCT block (the second medium frequency component MF2) is passed. Here, the high frequency components HF may be the first high frequency components HF1.

The first DCT mask generator 117 and the second DCT mask generator 137 are simultaneously or sequentially operated, and thus, the first DCT mask M1 and the second DCT mask M2 may be generated sequentially or in parallel. The first DCT mask M1 and the second DCT mask M2 may apply a weight to the frequency components.

The focus value calculator 106A may calculate a focus value AF by using each of the first DCT mask M1 and the second DCT mask M2 output from the mask generator 107A on the DCT block. The focus value calculator 106A may include a first calculator 116, a second calculator 136, and a selector 156.

The first calculator 116 may calculate a first focus value AF1 of an image by using the first DCT mask M1 on each DCT block. The first calculator 116 may calculate an average of the absolute values of DCT coefficients filtered by using the first DCT mask M1 on each DCT block and obtain an average of the averages of the absolute values of the DCT coefficients calculated with respect to the DCT blocks of the image, thereby calculating the first focus value AF1 of the image.

The second calculator 136 may calculate a second focus value AF2 of the image by using the second DCT mask M2 on each DCT block. The second calculator 136 may calculate an average of the absolute values of DCT coefficients filtered by using the second DCT mask M2 on each DCT block and obtain an average of the averages of the absolute values of the DCT coefficients calculated with respect to the DCT blocks of the image, thereby calculating the second focus value AF2 of the image.

The selector 156 may select the first focus value AF1 or the second focus value AF2. The selector 156 may compare a change rate of the first focus value AF1 and a change rate of the second focus value AF2, and select the first focus value AF1 or the second focus value AF2 having a large change rate as a focus value AF of an image. When the change rate of the first focus value AF1 is large, the selector 156 may determine that an image belongs to the first focusing area and select the first focus value AF1 as the focus value AF of the image. When the change rate of the second focus value AF2 is large, the selector 156 may determine that an image belongs to the second focusing area and select the second focus value AF2 as the focus value AF of the image.

In another example, when the second focus value AF2 is less than a threshold value, the selector 156 may determine that an image belongs to the first focusing area and select the first focus value AF1 as the focus value AF of the image, and when the second focus value AF2 is equal to or greater than the threshold value, the selector 156 may determine that an image belongs to the second focusing area and select the second focus value AF2 as the focus value AF of the image. The threshold value may be previously set to be a focus value at a boundary between the first focusing area and the second focusing area of the focus value graph (b) of FIGS. 6 and 7, or a value obtained by multiplying the focus value at the boundary by a predetermined constant.

The controller 109 may output a control signal to the driver 70 by determining a lens position in a direction in which the first focus value AF1 or the second focus value AF2 output from the focus value calculator 106A increases.

Figure 9:
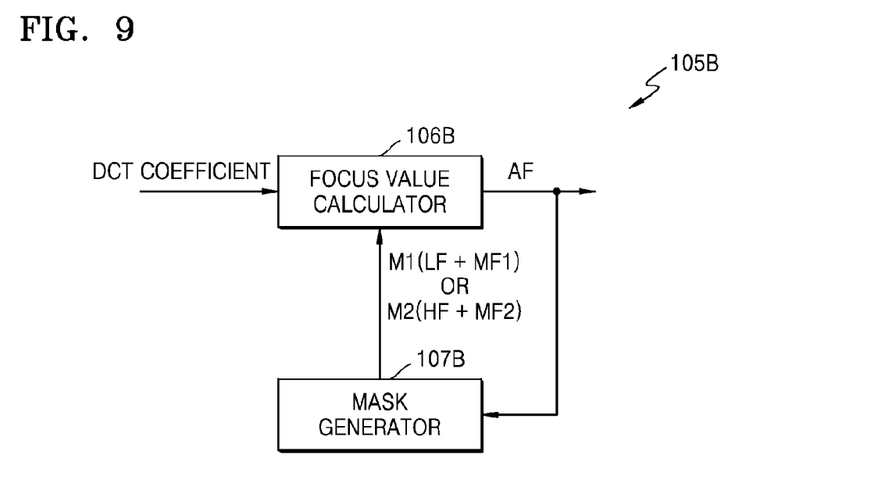
FIG. 9 is a block diagram schematically illustrating a structure of a focus value estimator, according to another exemplary embodiment.

FIG. 9 is a block diagram schematically illustrating a structure of a focus value estimator 105B, according to another exemplary embodiment.

Referring to FIG. 9, the focus value estimator 105B according to the present embodiment may include a focus value calculator 106B and a mask generator 107B.

The focus value calculator 106B may calculate the focus value AF of an image by applying the first DCT mask M1 or the second DCT mask M2 output from the mask generator 107B. The focus value calculator 106B may calculate an average of a DCT block masked with the first DCT mask M1 or the second DCT mask M2, that is, the absolute values of DCT coefficients filtered by the first DCT mask M1 or the second DCT mask M2 and obtain an average of the averages of the absolute values of the DCT coefficients calculated with respect to the DCT blocks of the image, thereby calculating the focus value AF of the image.

The mask generator 107B may generate the first DCT mask M1 or the second DCT mask M2 according to the focus value AF calculated by the focus value calculator 106B. The first DCT mask M1 may have a band pass filter function through which the first frequency area including the low frequency components LF and a part of the medium frequency components MF (the first medium frequency component MF1) of the DCT block is passed. The second DCT mask M2 may have a band pass filter function through which the second frequency area including the high frequency components HF and a part of the medium frequency components MF (the second medium frequency component MF2) of the DCT block is passed. The first DCT mask M1 and the second DCT mask M2 may apply a weight to the frequency component. Here, the high frequency components HF may be the first high frequency components HF1.

The mask generator 107B may set the first DCT mask M1 to a reference DCT mask and generate the first DCT mask M1 when auto-focusing begins. The focus value calculator 106B may output the first focus value AF1 calculated by using the first DCT mask M1, as the focus value AF. When the focus value AF is less than a threshold value, the mask generator 107B may generate the first DCT mask M1 for a next image. When the focus value AF is equal to or greater than the threshold value, the mask generator 107B may generate the second DCT mask M2 for the next image. The threshold value may be previously set to be a focus value at a boundary between the first focusing area and the second focusing area of the focus value graph (a) of FIGS. 6 and 7, or a value obtained by multiplying the focus value at the boundary by a predetermined constant.

The mask generator 107B may set the second DCT mask M2 as a reference DCT mask and generate the second DCT mask M2 when auto-focusing begins. The focus value calculator 106B may output the second focus value AF2 calculated by using the second DCT mask M2, as the focus value AF. When the focus value AF is equal to or greater than a threshold value, the mask generator 107B may generate the second DCT mask M2 for a next image. When the focus value AF is less than the threshold value, the mask generator 107B may generate the first DCT mask M1 for the next image. The threshold value may be previously set to be a focus value at a boundary between the first focusing area and the second focusing area of the focus value graph (b) of FIGS. 6 and 7, or a value obtained by multiplying the focus value at the boundary by a predetermined constant.

In other words, the mask generator 107B may generate a DCT mask for calculating the focus value of a next image according to the focus value AF calculated by the focus value calculator 106B.

The controller 109 may output a control signal to the driver 70 by determining a lens position in a direction which the focus value AF output from the focus value calculator 106B increases.

Figure 10:
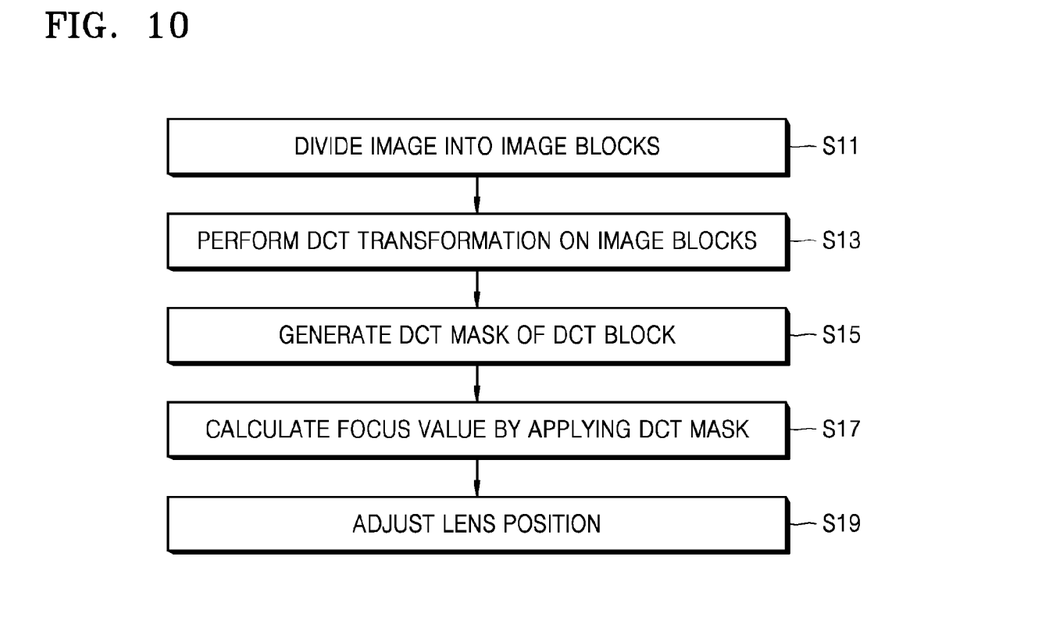
FIG. 10 is a flowchart for schematically describing an auto-focusing method according to an exemplary embodiment.

FIG. 10 is a flowchart for schematically describing an auto-focusing method according to an exemplary embodiment. In the following description, detailed descriptions about the structure that are redundant to the above descriptions are omitted.

Referring to FIG. 10, an auto-focusing system may divide an input image into a plurality of blocks, each having a predetermined size (S11) and perform two-dimensional DCT on each image block so as to transform a luminance signal of the image to DCT coefficients and output DCT blocks each comprising DCT coefficients (S13).

The auto-focusing system may generate a DCT mask for filtering a particular frequency component of the DCT block that is generated by performing DCT on an image block (S15). The auto-focusing system may generate at least one of a first DCT mask for selecting DCT coefficients corresponding to a first frequency area including low frequency components LF of AC components and a part of medium frequency components MF adjacent to the low frequency components LF, and a second DCT mask for selecting DCT coefficients corresponding to a second frequency area including high frequency components HF and a part of the medium frequency components MF adjacent to the high frequency components HF. The DCT mask may apply weights to the frequency components.

The auto-focusing system may calculate a focus value of an input image by applying the DCT mask to the DCT block (S17). The auto-focusing system may calculate an average of absolute values of the DCT coefficients that are frequency components of the DCT block which are selected by the DCT mask and obtain an average of the averages of the absolute values of the DCT coefficients calculated with respect to all DCT blocks, thereby calculating the focus value.

The auto-focusing system may perform auto-focusing by moving a lens position by at least one step in a direction in which the calculated focus value increases (S19).

Figure 11:
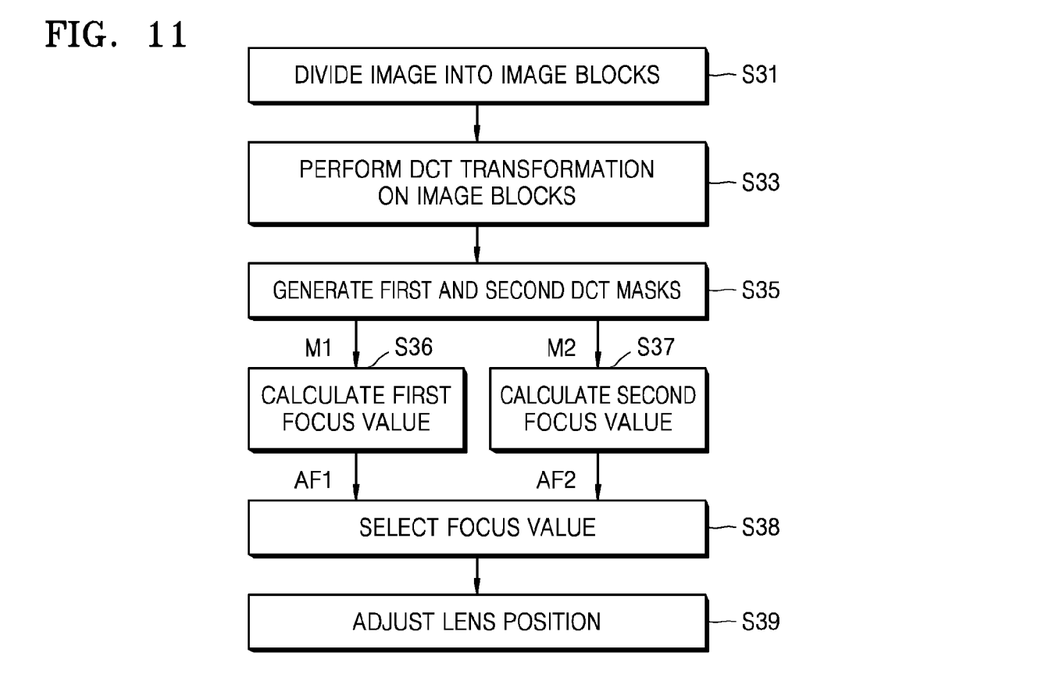
FIG. 11 is a flowchart for schematically describing an example of the auto-focusing method of FIG. 10.

FIG. 11 is a flowchart for schematically describing an example of the auto-focusing method of FIG. 10, according to an exemplary embodiment. In the following description, detailed descriptions about the structure that are redundant to the above descriptions are omitted.

Referring to FIG. 11, the auto-focusing system according to the present embodiment may divide an input image into a plurality of blocks each having a predetermined size (S31), and perform two-dimensional DCT on each image block so as to transform a luminance signal of the image to DCT coefficients and output DCT blocks each comprising DCT coefficients (S33).

The auto-focusing system may generate each of the first DCT mask M1 and the second DCT mask M2 (S35).

The auto-focusing system may calculate the first focus value AF1 and the second focus value AF2 by applying the first DCT mask M1 and the second DCT mask M2 to each DCT block that is generated by performing DCT on an image block (S36 and S37). The calculation of the focus value is the same as that described above.

The auto-focusing system may select the first focus value AF1 or the second focus value AF2 (S38). The auto-focusing system may compare a change rate of the first focus value AF1 and a change rate of the second focus value AF2 and select the first focus value AF1 or the second focus value AF2 having a large change rate as a focus value AF of an image. In another example, comparing the second focus value AF2 with a threshold value, the auto-focusing system may select the first focus value AF1 when the second focus value AF2 is less than the threshold value and the second focus value AF2 when the second focus value AF2 is equal to or greater than the threshold value.

The auto-focusing system may perform focusing by moving a lens position at least one step in a direction the selected focus value increase (S39).

Figure 12:
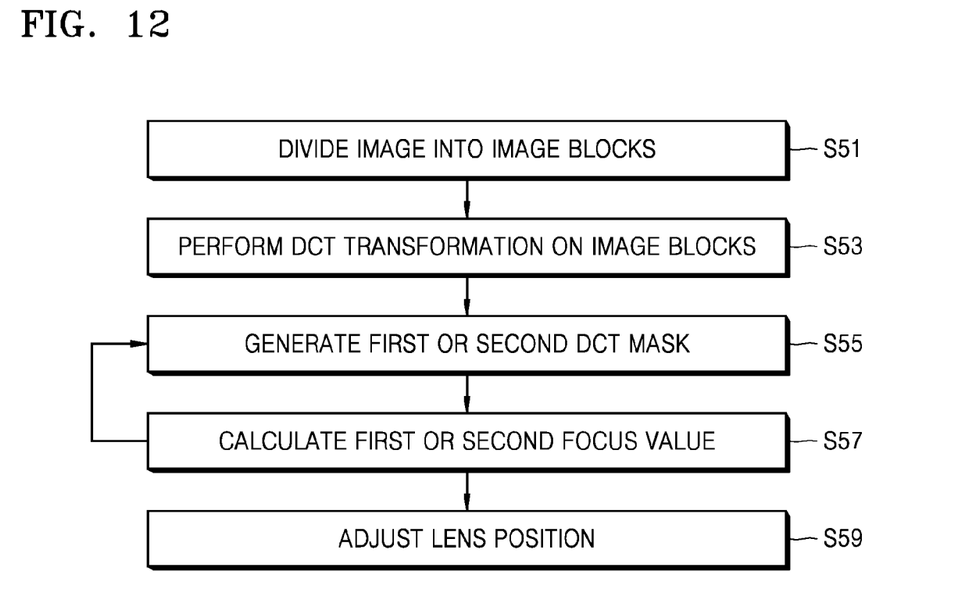
FIG. 12 is a flowchart for schematically describing another example of the auto-focusing method of FIG. 10.

FIG. 12 is a flowchart for schematically describing another example of the auto-focusing method of FIG. 10, according to an exemplary embodiment. In the following description, detailed descriptions about the structure that are redundant to the above descriptions are omitted.

Referring to FIG. 12, the auto-focusing system may divide an input image into a plurality of blocks each having a predetermined size (S51), and perform two-dimensional DCT on each image block so as to transform a luminance signal of the image to DCT coefficients and output DCT blocks each comprising DCT coefficients (S53).

The auto-focusing system may generate the first DCT mask M1 or the second DCT mask M2 (S55). When auto-focusing begins, the auto-focusing system may be set to automatically select the first DCT mask M1 or the second DCT mask M2 that is previously set.

The auto-focusing system may calculate the first focus value AF1 as the focus value AF by applying the generated first DCT mask M1 to the DCT block that is generated by performing DCT on an image block, or the second focus value AF2 as the focus value AF by applying the generated second DCT mask M2 (S57).

The auto-focusing system may compare the focus value AF with the threshold value and generate the first DCT mask M1 or the second DCT mask M2 with respect to a next image according to a result of the comparison. The auto-focusing system may generate the first DCT mask when the focus value AF is less than the threshold value and the second DCT mask when the focus value AF is equal to or greater than the threshold value. The threshold value may be set to be different according to whether the focus value AF is the first focus value AF1 or the second focus value AF2.

The auto-focusing system may perform focusing by moving a lens position at least one step in a direction the selected focus value increase (S59).

In the auto-focusing method according to the above embodiments, a DCT mask to use may be selected by image and, when the first DCT mask M1 is switched to the second DCT mask M2, the selection operation may be omitted and the second DCT mask M2 may be automatically selected afterwards.

In addition, other exemplary embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments. The media may also be a distributed network, so that the computer readable code is stored/transferred and executed in a distributed fashion. Furthermore, the processing element could include a processor or a computer processor, and processing elements may be distributed and/or included in a single device.

As described above, in the auto-focusing method according to the above exemplary embodiments, any phenomenon that prevents auto-focusing may be remarkably reduced and a clear image may be obtained by using DCT even in a low illumination environment.

It should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. An auto-focusing method comprising:
dividing an image into a plurality of blocks;
performing discrete cosine transform (DCT) on image data of the plurality of blocks to output a plurality of DCT blocks each comprising DCT coefficients;
generating a DCT mask for selecting DCT coefficients corresponding to a selected frequency range in a DCT block among the plurality of DCT blocks; and
calculating a focus value of the image by applying the DCT mask to the DCT block;
wherein the DCT block comprises a plurality of alternating current (AC) components divided into at least one low frequency component, at least one medium frequency component, and at least one high frequency component, and
wherein the generating the DCT mask comprises generating:
a first DCT mask for selecting DCT coefficients corresponding to the low frequency component and a first medium frequency component adjacent to the low frequency component; and
a second DCT mask for selecting DCT coefficients corresponding to the high frequency component and a second medium frequency component adjacent to the high frequency component.

2. The auto-focusing method of claim 1, wherein the calculating the focus value comprises:
calculating a first focus value of the image by applying the first DCT mask to the DCT block;
calculating a second focus value of the image by applying the second DCT mask to the DCT block; and
selecting one of the first focus value and the second focus value.

3. The auto-focusing method of claim 2, wherein the selecting comprises selecting one of the first focus value and the second focus value which has a lager change rate of a focus value.

4. The auto-focusing method of claim 2, wherein the selecting comprises:
selecting the first focus value if the second focus value is less than a threshold value; and
selecting the second focus value if the second focus value is equal to or greater than the threshold value.

5. The auto-focusing method of claim 1, wherein the generating the DCT mask comprises:
generating the first DCT mask if the focus value is less than a threshold value; and
generating the second DCT mask if the focus value is equal to or greater than the threshold value.

6. The auto-focusing method of claim 1, wherein the high frequency component comprises a first high frequency component and a second high frequency component that is higher than the first high frequency component, and
wherein the second DCT mask is used for selecting DCT coefficients corresponding to the first high frequency component and the second medium frequency component adjacent to the first high frequency component.

7. The auto-focusing method of claim 1, wherein weights are applied differently to the DCT coefficients selected by the first DCT mask or the second DCT mask.

8. The auto-focusing method of claim 7, wherein a weight of the first DCT mask applied to the low frequency component increases in inverse proportion to a frequency value, and
wherein a weight of the second DCT mask applied to the high frequency component increases in proportion to the frequency value.

9. The auto-focusing method of claim 1, wherein the calculating the focus value comprises:
calculating an average of absolute values of DCT coefficients of each DCT block that is masked with the DCT mask; and
calculating an average of the averages of the absolute values of the DCT coefficients calculated with respect to the plurality of DCT blocks of the image, as the focus value of the image.

10. An auto-focusing system comprising:
a divider configured to divide an image into a plurality of blocks;
a discrete cosine transform (DCT) processor configured to perform DCT on image data of the plurality of blocks to output a plurality of DCT blocks each comprising DCT coefficients;
a mask generator configured to generate a DCT mask for selecting DCT coefficients corresponding to a selected frequency range in a DCT block among the plurality of DCT blocks; and
a focus value calculator configured to calculate a focus value of the image by applying the DCT mask to the DCT block,
wherein the mask generator is configured to divide a plurality of alternating current (AC) components of the DCT block into at least one low frequency component, at least one medium frequency component, and at least one high frequency component, and
wherein the mask generator is further configured to generate:
a first DCT mask for selecting DCT coefficients corresponding to the low frequency component and a first the medium frequency component adjacent to the low frequency component; and
a second DCT mask for selecting DCT coefficients corresponding to the high frequency component and a second medium frequency component adjacent to the high frequency component.

11. The auto-focusing system of claim 10, wherein the focus value calculator comprises:
a first calculator configured to calculate a first focus value of the image by applying the first DCT mask to the DCT block;
a second calculator configured to calculate a second focus value of the image by applying the second DCT mask to the DCT block; and
a selector configured to select one of the first focus value and the second focus value.

12. The auto-focusing system of claim 11, wherein the selector is configured to select one of the first focus value and the second focus value which has a lager change rate of a focus value.

13. The auto-focusing system of claim 11, wherein the selector is configured to select the first focus value if the second focus value is less than a threshold value, and select the second focus value if the second focus value is equal to or greater than the threshold value.

14. The auto-focusing system of claim 10, wherein the mask generator is configured to generate the first DCT mask if the focus value is less than a threshold value, and generate the second DCT mask if the focus value is equal to or greater than the threshold value.

15. The auto-focusing system of claim 10, wherein the high frequency component comprises a first high frequency component and a second high frequency component that is higher than the first high frequency component, and
wherein the second DCT mask is used for selecting DCT coefficients corresponding to the first high frequency component and the second medium frequency component adjacent to the first high frequency component.

16. The auto-focusing system of claim 10, wherein the mask generator is further configured to apply weights differently to the DCT coefficients selected by the first DCT mask or the second DCT mask.

17. The auto-focusing system of claim 16, wherein a weight of the first DCT mask applied to the low frequency component increases in inverse proportion to a frequency value, and
wherein a weight of the second DCT mask applied to the high frequency component increases in proportion to the frequency value.

18. The auto-focusing system of claim 10, wherein the focus value calculator is configured to calculate an average of absolute values of DCT coefficients of each DCT block that is masked with the DCT mask, and calculate an average of the averages of the absolute values of the DCT coefficients calculated with respect to the plurality of DCT blocks of the image, as the focus value of the image.

* * * * *